US010393987B2

(12) United States Patent
Nguyen et al.

(10) Patent No.: US 10,393,987 B2
(45) Date of Patent: Aug. 27, 2019

(54) OPTICAL RAIL SYSTEM AND METHOD USING QUICK-DISCONNECT OPTICAL COMPONENT MOUNTS

(71) Applicant: NEWPORT CORPORATION, Irvine, CA (US)

(72) Inventors: Albert Nguyen, Costa Mesa, CA (US); James Fisher, Tustin, CA (US); Richard Sebastian, Costa Mesa, CA (US)

(73) Assignee: Newport Corporation, Irvine, CA (US)

( * ) Notice: Subject to any disclaimer, the term of this patent is extended or adjusted under 35 U.S.C. 154(b) by 89 days.

(21) Appl. No.: 15/315,325

(22) PCT Filed: Jun. 6, 2014

(86) PCT No.: PCT/US2014/041397
§ 371 (c)(1),
(2) Date: Nov. 30, 2016

(87) PCT Pub. No.: WO2015/187184
PCT Pub. Date: Dec. 10, 2015

(65) Prior Publication Data
US 2017/0191611 A1 Jul. 6, 2017

(51) Int. Cl.
*G02B 7/00* (2006.01)
*G01M 11/04* (2006.01)

(52) U.S. Cl.
CPC ............. *G02B 7/003* (2013.01); *G01M 11/04* (2013.01)

(58) Field of Classification Search
CPC ....... G01M 11/04; G02B 7/003; G02B 7/021; G02B 7/02; G02B 7/004
(Continued)

(56) References Cited

U.S. PATENT DOCUMENTS 2,864,279 A * 12/1958 Phifer .................... G01N 21/03 250/428
3,945,600 A * 3/1976 Mallwitz .................. B01L 9/00 248/466
(Continued)

FOREIGN PATENT DOCUMENTS

CA 2159398 A1 * 3/1997 ............ G01M 11/04
DE 1214028 B * 4/1966 ............ G01M 11/04
(Continued)

OTHER PUBLICATIONS

Thorlabs, 16mm Removable Segment Cage Plate, Feb. 17, 2011, 1 page.
(Continued)

*Primary Examiner* — Michael Safavi
(74) *Attorney, Agent, or Firm* — Loza & Loza, LLP; George Fountain

(57) ABSTRACT

An optical rail system that includes an electronic component mount configured to be mounted on rails between two previously-mounted electronic component mounts without the need of removing one of the two previous-mounted mounts. The electronic component mount includes grooves configured to securely register with respective portions of the rails. The mount further comprises locking devices for securely locking the portions of the rails to the housing within the grooves. The mount additionally includes a dock for securely hosting one or more optical components. Also disclosed is a rail mount for facilitating the mounting the optical rail system to an optical table or other structure. The rail mount includes grooves for securely registering with respective portions of the rails, locking devices for more securely locking the rails within the grooves, and an attachment structure for attaching the rail mount to a post, the post
(Continued)

being configured for mounting to an optical table or other structure.

25 Claims, 7 Drawing Sheets

(58) Field of Classification Search
USPC .......................................... 356/244; 359/819
See application file for complete search history.

(56) References Cited

U.S. PATENT DOCUMENTS

| | | | | | |
|---|---|---|---|---|---|
| 4,047,820 | A * | 9/1977 | Soodak | G01N 21/253 250/576 |
| D256,470 | S * | 8/1980 | Gordon | 356/244 |
| 4,559,447 | A * | 12/1985 | Schlotter | G05B 19/291 250/231.18 |
| 4,583,860 | A * | 4/1986 | Butner | G01N 21/255 250/228 |
| 5,035,333 | A * | 7/1991 | Klingner | G01M 11/04 211/189 |
| 5,828,502 | A * | 10/1998 | Afshari | G01M 11/04 359/819 |
| 5,999,254 | A * | 12/1999 | Seibert | G03F 7/707 356/244 |
| 6,399,026 | B1 | 6/2002 | Karrai | |
| 7,842,247 | B2 * | 11/2010 | Maurer | G01N 21/0332 165/48.1 |
| 2004/0004718 | A1 * | 1/2004 | Griffus | G01J 3/02 356/402 |
| 2009/0266967 | A1 * | 10/2009 | Allen | G01M 11/04 248/512 |

FOREIGN PATENT DOCUMENTS

| | | | | |
|---|---|---|---|---|
| DE | 2636657 | A1 * | 2/1978 | G01M 11/04 |
| DE | 2636657 | A1 | 2/1978 | |
| DE | 3219399 | A1 * | 11/1983 | G01M 11/04 |
| DE | 3804242 | * | 8/1988 | G02B 7/00 |
| DE | 2008008703 | | 10/2008 | |
| DE | 202008008703 | U1 | 10/2008 | |
| FR | 2221789 | A1 * | 10/1974 | B01L 9/00 |
| GB | 655856 | A * | 8/1951 | G01M 11/04 |
| WO | WO-00/55592 | * | 9/2000 | G02B 7/00 |
| WO | WO-0055592 | A1 * | 9/2000 | G01M 11/04 |
| WO | WO-0113155 | A1 * | 2/2001 | G01M 11/04 |
| WO | WO-02091056 | A1 * | 11/2002 | G02B 7/003 |
| WO | WO2004006212 | | 1/2004 | |

OTHER PUBLICATIONS

Chinese Office Action for Chinese Application No. 201480079785.4, dated Jul. 10, 2018, 8 pages.
European Search Report for European Application No. 14894152.9, dated Jan. 22, 2018, 7 pages.
Thorlabs Inc. 16mm Removable Segment Cage Plate (drawing) (Feb. 8, 2011).
Thorlabs Inc. 16mm Compact Cage Plate (drawing) (Oct. 19, 2006).
PCT/US2014/041397. International Search Report & Written Opinion (dated Nov. 6, 2014).
Thorlabs—SP06 16 mm Removable Segment Case Plate, 0.25" Thick, https://www.thorlabs.com/thorproduct.cfm?partnumber=CP09T; dated Feb. 17, 2011, 2 pages.
Thorlabs—CP360 R/M—Pivotin, Quick-Release, 01" Optic Mount 30mm Cage System, https://www.thorlabs.com/thorproduct.cfm?partnumber=CP360R/M, dated Jan. 15, 2018, 1 page.

* cited by examiner

OPTICAL RAIL SYSTEM AND METHOD USING QUICK-DISCONNECT OPTICAL COMPONENT MOUNTS

FIELD

This disclosure relates generally to optical systems, and in particular, to an optical rail system and method using quick-disconnect optical component mounts.

BACKGROUND

Optical measurement systems are typically employed to measure certain properties or characteristics of one or more specimens. In implementing such measurements, optical measurement systems employ various optical components arranged in a particular manner in order to effectuate the intended measurement on the one or more specimens. Such optical components include, but are not limited to, light sources, filters, lenses, mirrors, spatial filters, modulators, choppers, collimators, detectors, diffusers, fiber optics, and others.

Often, optical measurement systems include an optical rail system to facilitate the mounting and arranging of the optical components of the intended optical measurement system. Typically, an optical rail system consists of a plurality of parallel rails, such as four (4) rails arranged in a quad fashion, and a plurality of optical component mounts secured to the rails. Each optical component mount is configured to mechanically host one or more optical components.

In the past, an optical component mount consists of a plurality of thru-holes, typically arranged in a quad fashion. Each optical component mount is mounted on the rails by sliding the mount such that the rails move coaxially into the respective thru-holes of the mount. Similarly, each optical component mount is dismounted from the optical rail system by sliding the mount such that the rails move coaxially out of the respective thru-holes of the mount.

A drawback of such optical rail system is that it requires substantial amount of effort to add one or more optical component mounts between already-installed mounts. For instance, to add an optical component mount between a pair of already-installed mounts, one of the already-installed mounts needs to be removed by sliding the mount off the rails. Then, the newly added optical component mount is slid into the optical rail system. After the newly added mount is installed on the optical rail system, the previously-removed mount is stalled on the optical rail system again.

As can be envisioned, such optical rail system does not easily lend itself to an optical measurement system that needs to be reconfigured often for the intended measurement. As discussed, already-installed mounts need to be removed off and remounted on the optical rail system. Such mounts also needs to be precisely aligned again, as distance and orientation with respect to other optical components are often important in such optical measurement systems.

Thus, there is a need, among other needs, for an improved optical rail system that facilitates the mounting and dismounting of new optical component mounts between previously-installed mounts.

SUMMARY

An optical rail system that includes an electronic component mount configured to be mounted on rails between two previously-mounted electronic component mounts without the need of removing one of the two previous-mounted mounts. Other one or more mounts may be mounted on the optical rail system for the purpose of mounting the optical rail system on an optical table or other structure. Optical rail systems may be cascaded along the longitudinal axis and/or lateral axis of the optical rail systems.

In one aspect of the disclosure, the optical rail system comprises a plurality of rails, and a mount secured to the rails. The mount comprises a housing including a plurality of grooves registered with respective portions of the rails. In another aspect, the grooves are configured to register with the respective portions of the rails in a friction fit manner.

In another aspect of the disclosure, the mount housing comprises a plurality of flexible flanges forming respective portions of boundaries of the grooves. In yet another aspect, the mount comprises a plurality of locking devices for securely attaching the rails to the housing within the grooves, respectively. In still another aspect, the locking devices comprise screws extended through holes within the flexible flanges and threaded with threaded holes within the housing, wherein tightening of the screws moves the flexible flanges against the rails within the grooves, respectively. In another aspect, the locking devices comprise screws extended through threaded holes within the housing and making end contact with the flexible flanges, wherein tightening of the screws moves the flexible flanges against the rails within the grooves, respectively.

In another aspect of the disclosure, the mount further comprises a dock for securely hosting an optical component. In yet another aspect, the dock is configured as a threaded hole within the mount housing, the threaded hole being configured to thread with a threaded outer shell of the optical component. In still another aspect, the dock is configured as a non-threaded hole within the housing. In another aspect, the non-threaded hole comprises one or more alignment protrusions or indentations configured to register with one or more alignment indentations or protrusions of an outer shell of the optical component, respectively.

In another aspect of the disclosure, the optical rail system comprises a locking device for more securely maintaining the optical component within the non-threaded hole of the dock. In still another aspect, the locking device comprises a screw extended through a threaded hole within the housing and making end contact with an outer shell of the optical component, wherein tightening of the screw causes the end contact to apply more pressure against the optical component to more securely lodge the optical component within the non-threaded hole of the housing.

In another aspect of the disclosure, the mount housing is further configured to attach to a post, wherein the post, in turn, is configured to attach to an optical table or other structure. In still another aspect, the mount comprises a screw extended through a thru-hole of the housing comprises and threaded with a threaded hole of the post. In yet another aspect, the mount housing comprises recesses proximate the grooves, wherein the recesses are configured to accommodate the rails prior to insertion into and after removal from the grooves, respectively.

Other aspects, advantages and novel features of the disclosure will become apparent from the following detailed description of the invention when considered in conjunction with the accompanying drawings.

DETAILED DESCRIPTION OF THE EXEMPLARY EMBODIMENTS

Figure 1:
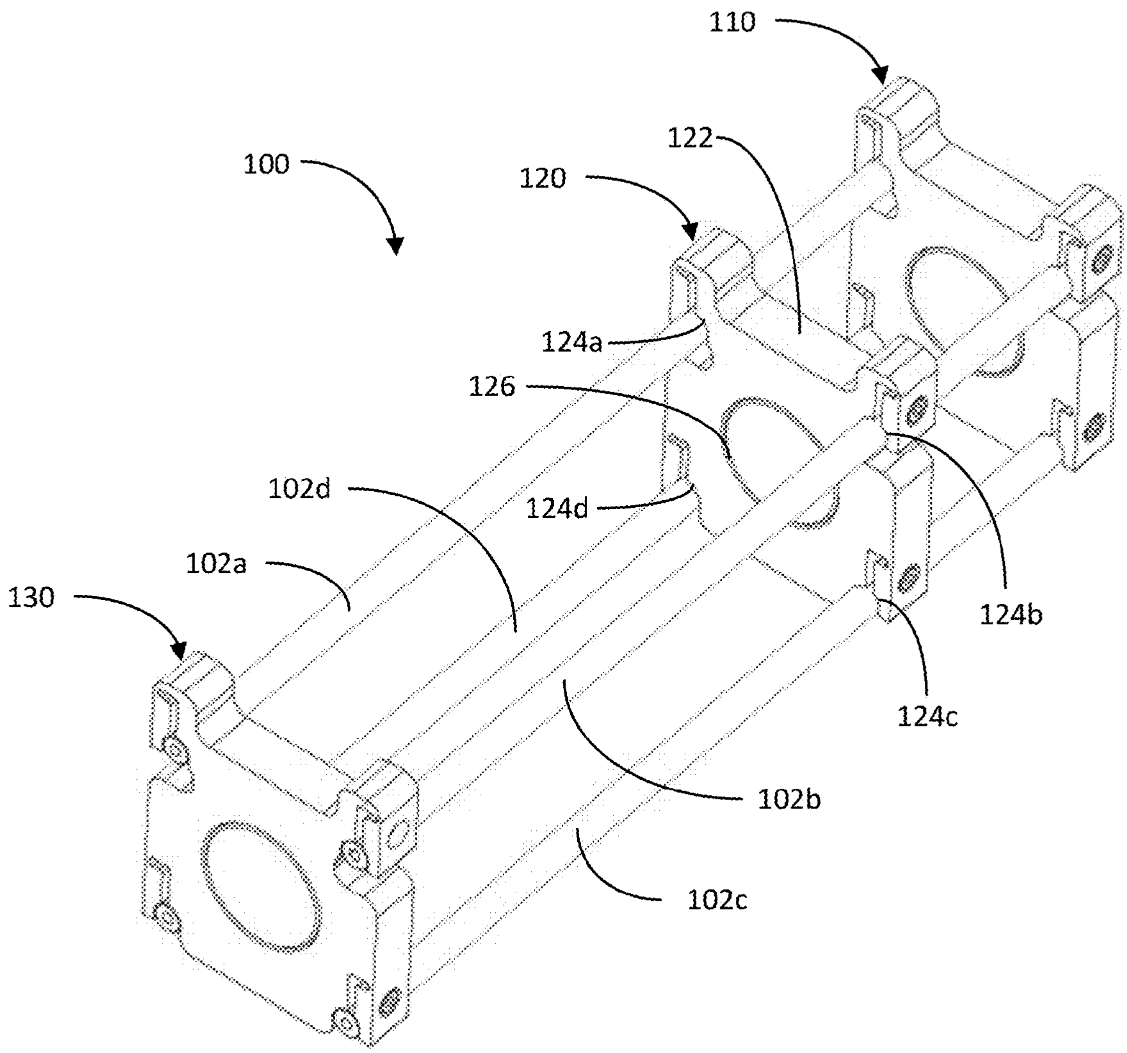
FIG. 1 illustrates a perspective view of an exemplary optical rail system in accordance with an aspect of the disclosure.

FIG. 1 illustrates a perspective view of an exemplary optical rail system 100 in accordance with an aspect of the disclosure. In summary, the optical rail system 100 is configured to facilitate the installation and removal of optical component mounts between previously-installed optical component mounts. That is, in accordance with the new optical rail system 100, the installation and removal of an optical component mount between a pair of previously-installed mounts does not require the removal of any of the previously-installed mounts.

More specifically, the optical rail system 100 comprises a plurality of rails 102*a*-102*d*. In the exemplary embodiment, the optical rail system 100 includes four (4) substantially parallel rails 102*a-d* arranged in a quad fashion. Additionally, in accordance with the exemplary embodiment, each of the rails 102*a-d* has a substantially circular cross-section. It shall be understood that the optical rail system 100 may include a different number of rails (e.g., <4 or >4), may be arranged in a different fashion other than in a quad fashion, and may have a different shaped cross-section.

In the exemplary embodiment, the optical rail system 100 includes three (3) optical component mounts 110, 120, and 130. The optical component mounts 110 and 130 are mounted to the ends of the rails 102*a-d*. The optical component mount 120 is mounted to the rails 102*a-d* between the optical component mounts 110 and 130. Although, in this example, the optical rail system 100 includes three (3) optical component mounts 110, 120, and 130, it shall be understood that the optical rail system 100 may include a different number of mounts (e.g., <3 or >3). Additionally, although the optical component mounts 110 and 130 are mounted to the ends of the rails 102*a-d*, it shall be understood that one or both of the optical component mounts 110 and 130 may be mounted to different locations (e.g., not at the ends) along the rails 102*a-d*.

Using optical component mount 120 as an example, each of the optical component mounts 110, 120, and 130 comprises a housing 122 that includes a plurality of grooves 124*a-d*. The grooves 124*a*-124*d* are configured to mate with or receive respective portions of the rails 102*a-d* in order to secure the optical component mount 120 on the rails 102*a*-102*d*. In the exemplary embodiment, the rails 102*a-d* are mounted within the respective grooves 124*a-d* in a friction fit manner, as discussed in more detail herein. Additionally, also as discussed in more detail herein, each of the optical component mounts 120, 130, and 140 include locking screws for more securely mounting or locking the mounts on the rails 102*a-d*. Further, each of the optical component mounts 120, 130, and 140 includes an optical component dock 126 for securely receiving or mating with a particular or selected optical component, as discussed in more detail herein.

Although, in this example the optical component mounts 110, 120, and 130 have been described as being configured substantially the same, it shall be understood that the mounts may be configured differently with respect to each other. Additionally, although in this example, the optical component mounts 110, 120, and 130, each includes four (4) grooves 124*a-d* for mating with the four (4) rails 102*a-d*, it shall be understood that the optical component mounts may each include a different number of grooves to match the number of rails of the optical rail system (e.g., <4 or >4). Also, as is discussed with respect to another embodiment, the number of grooves of a mount need not match the number of rails of the optical rail system.

Figure 2:
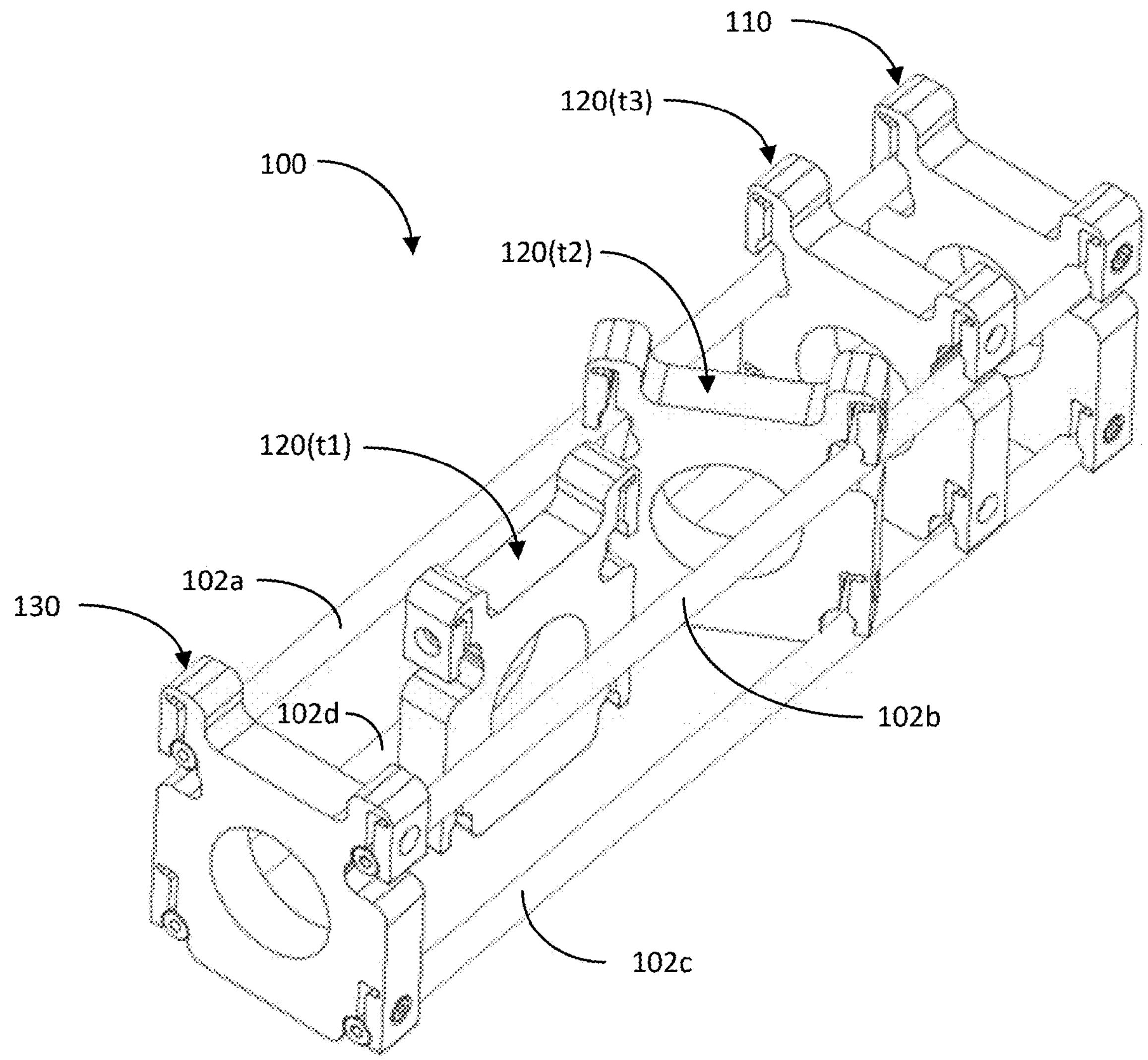
FIG. 2 illustrates a perspective view of the exemplary optical rail system of FIG. 1, depicting exemplary methods of installing and uninstalling an optical component mount to and from the optical rail system in accordance with another aspect of the disclosure.

FIG. 2 illustrates a perspective view of the exemplary optical rail system 100, depicting exemplary methods of installing and uninstalling the optical component mount 120 to and from the optical rail system 100 in accordance with another aspect of the disclosure. As previously discussed, one of the advantages of the optical rail system 100 is that the insertion and removal of an optical component mount to and from the optical rail system need not require the removal of other optical component mounts on the optical rail system. For instance, as illustrated, the installation and removal of the optical component mount 120 on the rails 102*a-d* between optical component mounts 110 and 130 does not require the removal of either optical component mount 110 or 130.

For instance, considering the installation of optical component mount 120 on the optical rail system 100, at time t1, a user positions the optical component mount 120 between and generally parallel with respective pairs of rails 120*a-b* and 120*c-d*. At time t2, the user rotates the optical component mount 120 to position the grooves 124*a-d* over the rails 102*a-d*, respectively. As discussed in more detail herein, the optical component mount 120 includes recesses under respective grooves 124*a-b* to narrow the width of the mount, such that it is smaller than the minimum cross distance between the rails 120*a-b*. This allows the rails 120*a-b* to be positioned directly under the respective grooves 124*a-b* to facilitate the insertion and removal of the rails into and out of the grooves.

At time t3, the user pushes (or pulls) the optical component mount 120 against the rails 102*a-d*, such that the rails snap into the corresponding grooves 124*a-d* in a friction fit manner. The user may then slide the optical component mount 120 along the rails 102*a-d* in order to properly position the mount, and then may install and tighten the locking screws in order to more securely or lock the mount on the rails 102*a-d* in the desired location.

The removal of the optical component mount 120 from the optical rail system 100 is similar to the installation thereof, albeit, in an opposite manner. In particular, when a user desires to remove the optical component mount 120, at time t3, the user removes the locking screws from the mount. Then, at time t2, the user pulls (or pushes) the optical component mount 120 off the rails 120*a-d*. Again, the recesses below the respective grooves 124*a-b* provide spaces for the rails 120*a-b* after the mount is initially removed off the rails. At time t1, the user rotates the optical component mount 120 so that it is situated between and generally parallel with respective pairs of rails 120*a-b* and 120*c-d*. The user may then completely remove the optical component mount 120 from the optical rail system 100.

As described above, the insertion and removal of the optical component mount 120 to and from the optical rail system 100 does not require the removal of the other optical component mounts 110 and 130. This allows a user to easily reconfigure an optical measurement system by easily inserting and removing optical components without removing other optical components. For example, if a user is performing two types of measurements, one measurement using all three optical component mounts 110, 120, and 130, and the other using only 110 and 130, the user may perform the first measurement and then easily remove the mount 120 to perform the second measurement. As discussed in the Background section, other optical rail systems require that one of the mounts 110 or 130 be removed in order to install or remove the interposed mount, which is time consuming, disturbs the measurement environment, and may be difficult to precisely reposition the mount at the exact location on the rails. Thus, the optical rail system 100 offers substantial advantages over prior optical rail systems.

Figure 3:
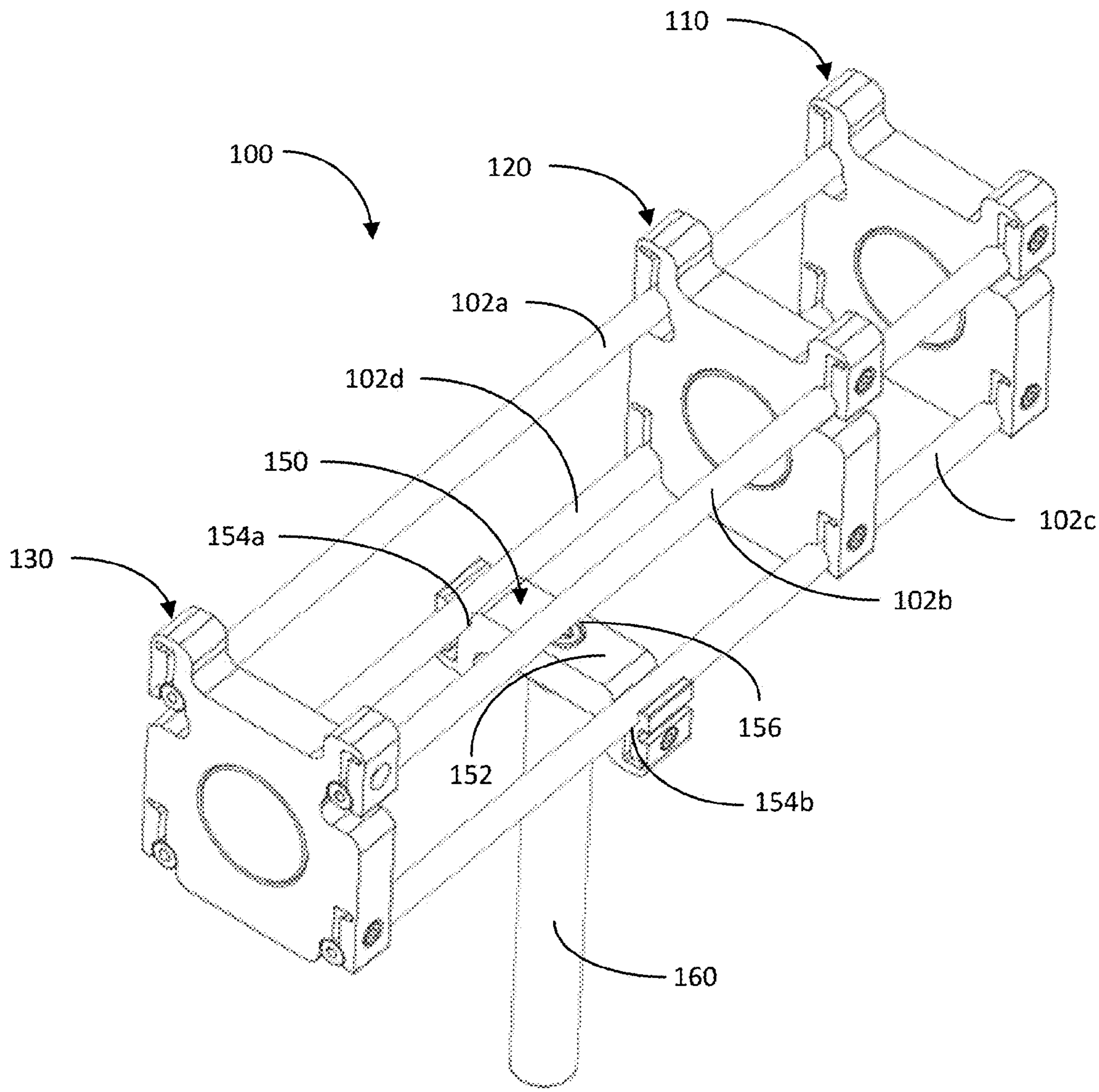
FIG. 3 illustrates a perspective view of the exemplary optical rail system of FIG. 1 with an additional mount for supporting the optical rail system on an optical table or other structure in accordance with another aspect of the disclosure.

FIG. 3 illustrates a perspective view of the exemplary optical rail system 100 with a rail mount 150 for supporting the optical rail system 100 on an optical table or other structure in accordance with another aspect of the disclosure. In the exemplary embodiment, the optical component mounts 110, 120, and 130 each have the same number of grooves (e.g., four (4)) as the number of rails 102*a-d* (e.g., four (4)). The rail mount 150, on the other hand, has a different number of grooves (e.g., two (2)) than the number of rails 102*a-d* (e.g., four (4)). Although, as discussed in more detail herein, the rail mount 150 is used to mount the optical rail system 100 on an optical table or other structure, it shall be understood that the mount 150 may be configured to support one or more optical components.

In particular, the rail mount 150 comprises a housing 152 including a pair of grooves 154*a-b*. In this example, the grooves 154*a-b* are configured to receive or mate with the lower pair of rails 102*d-c* of the optical rail system, respectively. Similar to the optical component mounts 110, 120, and 130, the rails 102*d-c* may be semi-securely positioned within the grooves 154*a-b* in a friction fit manner. Additionally, the rail mount 150 may also include screws to more securely attach or lock the rails 102*d-c* onto the housing 152 within the grooves 154*a-b*.

The optical rail system 100 further includes a supporting post 160 for supporting the optical rail system 100 on an optical table or other structure. The supporting post 160 securely mates with the rail mount 150. In this regards, the rail mount 150 may also include a counterbore, non-threaded thru-hole 156 extending centrally from a top surface to a lower surface of the housing 152. Although not shown in FIG. 3 (but shown in FIG. 8B), the supporting post 160 includes a threaded hole extending longitudinally from a top surface of the post to a defined distance within the post. A threaded screw extends within the thru-hole 156 of the rail mount 150 and threads into the threaded hole of the post 160 in order to secure the post to the rail mount. The lower portion of the post 160 may be configured to securely attach to an optical table or other structure.

Figure 4A:
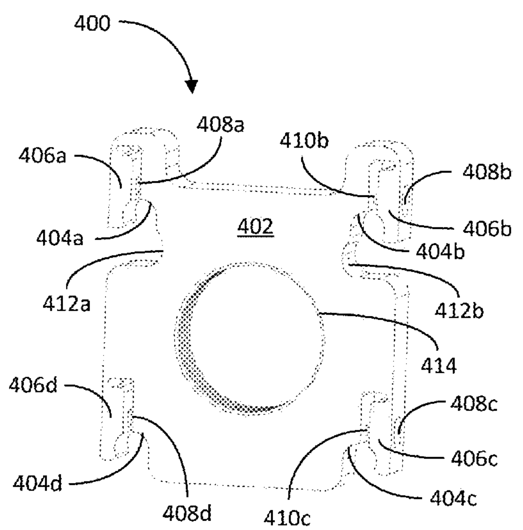
FIGS. 4A-4B illustrate perspective and front views of an exemplary optical component mount for an exemplary optical rail system in accordance with another aspect of the disclosure.
Figure 4B:
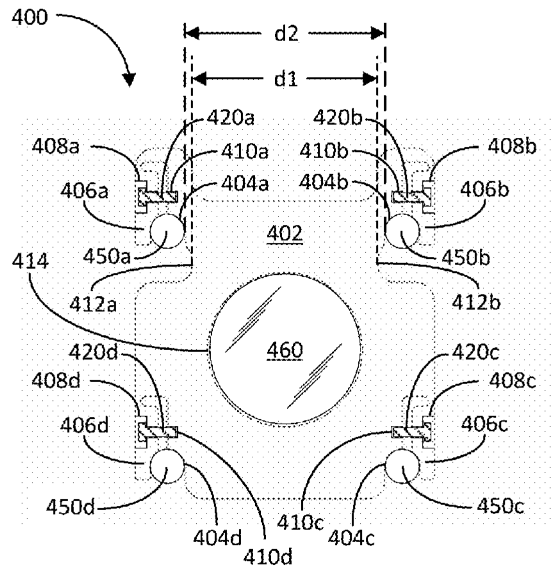

FIGS. 4A-4B illustrate perspective and front views of an exemplary optical component mount 400 for an exemplary optical rail system in accordance with another aspect of the disclosure. In particular, FIG. 4A illustrates the optical component mount 400 not being mounted on an optical rail system and not hosting an optical component. FIG. 4B illustrates the optical component mount 400 securely mounted on an optical rail system and hosting an optical component.

The optical component mount 400 comprises a housing 402. The housing 402 includes a plurality of grooves 404*a-d* (e.g., four (4)) for mating with corresponding rails of an optical rail system. The housing 402 further includes a plurality of flexible flanges 406*a-d*, portions of which form part of the boundaries of the grooves 404*a-d*, respectively. The flexible flanges 406*a-d* include a plurality of counterbore, non-threaded thru-holes 408*a-d* proximate or above the respective grooves 404*a-d*, and extending horizontally from an outward surface to an internal surface of the housing 402. The housing 402 further comprises internal threaded holes 410*a*-410*d* that coaxially align with the thru-holes 408*a-d*, respectively. Additionally, the housing 402 includes a pair of recesses 412*a-b* directly below the mouths of the respective grooves 404*a-b* to accommodate the rails prior to insertion into and after removal from the grooves 404*a-d*.

Additionally, the housing 402 includes an optical component dock in the form of a threaded hole 414 for securely mating with an optical component 460 having a corresponding threaded outer shell. If the optical component 406 allows the passage of light therethrough, the threaded hole 414 may be configured as a thru-hole. If the optical component 406 does not allow the passage of light therethrough, as in the case of a mirror or other reflective device, the threaded hole 414 may be configured as a non-thru-threaded hole.

With particular reference to FIG. 4B, a plurality of locking screws 420*a-d* are inserted through the counterbore, non-threaded holes 408*a-d* extending through the flexible flanges 406*a-d*, respectively. The plurality of locking screws 420*a-d* thread with the internal threaded holes 410*a-d* of the housing 402. The tightening of the locking screws 420*a-d* causes the flexible flanges 406*a-d* to apply pressure to rails 450*a-d* against the housing 402 to more securely mate or lock the optical component mount 400 onto the rails 450*a-d*. It follows that the loosening of the locking screws 420*a-d* causes the flexible flanges 406*a-d* to reduce the pressure they apply to the rails 450*a-d* against the housing 402 to allow the optical component mount 400 to be removed from the rails 450*a-d*.

As discussed above, the recesses 412*a-b* of the housing 402 narrow the width of the housing 402 proximate the mouths of the grooves 404*a-b*. Accordingly, the recesses 412*a-b* accommodate the rails 450*a-b* prior to insertion into and after removal from the corresponding grooves 404*a-b*. To effectuate the proper positioning of the rails 450*a-b* below the respective grooves 404*a-b*, the width d1 of the housing 402 at the section where the recesses 412*a-b* are located should be less than the minimum cross distance d2 between the parallel rails 450*a-b* (e.g., d1<d2).

Also, with further reference to FIG. 4B, the optical component 460 is securely mounted to the optical component mount 400 within the centrally-located threaded hole 414 of the optical component dock. The optical component 460 may be any active or passive optical components. Examples of optical components include, but are not limited to, light sources, filters, lenses, mirrors, spatial filters, modulators, choppers, collimators, detectors, diffusers, fiber optics, and others. The optical component 460 may have fixed (non-adjustable) characteristics or adjustable characteristics, as discussed further herein with reference to another embodiment. Although, in the exemplary embodiment, the threaded hole 414 and the corresponding optical component 460 are circular in shape, it shall be understood that the threaded hole and the corresponding optical component may be configured into other shapes, such as square, rectangular, trapezoidal, pentagon, hexagon, and others.

Figure 5A:
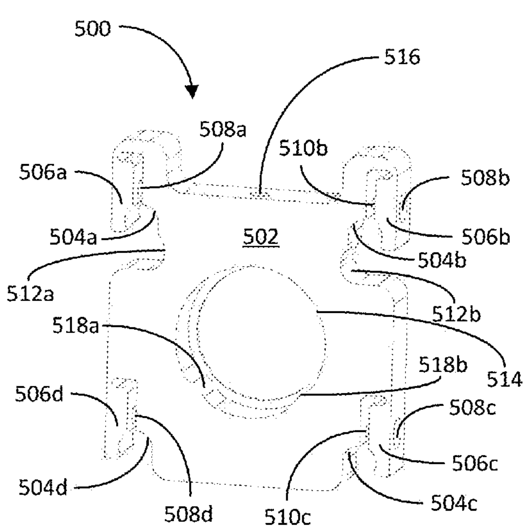
FIGS. 5A-5B illustrate perspective and front views of another exemplary optical component mount for an exemplary optical rail system in accordance with another aspect of the disclosure.
Figure 5B:
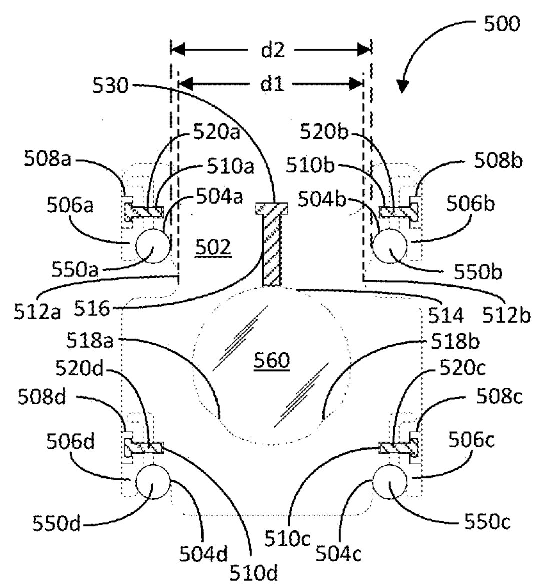

FIGS. 5A-5B illustrate perspective and front views of another exemplary optical component mount 500 for an exemplary optical rail system in accordance with another aspect of the disclosure. The optical component mount 500 is similar to the optical component mount 400, and includes many of the same elements as indicated by the same reference numbers with the most significant digit being a "5" not a "4". The optical component mount 500 differs from the optical component mount 400 in that the mount 500 includes a differently-configured optical component dock for securely receiving an optical component.

In particular, the optical component mount 500 comprises a housing 502 including a plurality of grooves 504*a-d* for receiving in a friction fit manner portions of rails 550*a-d* of an optical rail system, respectively. The housing 502 further includes structure for more securely mating or locking the optical component mount 500 onto the rails 550*a-d*. Such structure includes flexible flanges 506*a-d*, counterbore non-threaded holes 508*a-d*, threaded holes 510*a-d*, and screws 520*a-d*, respectively. The locking and unlocking operations of these elements have been already discussed with reference to optical component mount 400. Additionally, the optical component 500 further includes recesses 512*a-b* proximate the mouths of the grooves 504*a-b* to receive the rails 550*a-b* prior to insertion into and after removal from the grooves, respectively.

In order to securely mount the optical component 560 onto the optical component mount 500, the optical component mount 500 comprises a optical component dock in the form of a non-threaded hole 514 having aligning protrusions 518*a-b*. Similarly, the optical component 560 includes an outer shell or housing having a shape complementary to the shape of the non-threaded hole 514. That is, in this example, the outer shell or housing of the optical component 560 is generally circular in shape, but includes one or more indentations configured to register with the one or more protrusions 518*a-b* of the non-threaded hole 514.

Additionally, the housing 502 of the optical component mount 500 further includes a threaded hole 516 extending from an upper surface of the housing 502 to the upper portion of the non-threaded hole 514. A locking screw 530 is configured to be threaded through the threaded hole 516 and make end contact with the optical component 560, properly situated within the non-threaded hole 514. The locking screw 530 is configured to apply pressure to the optical component 560 to securely lodge the optical component 560 within the non-threaded hole 514.

Similar to the previous embodiment, the shape of the non-threaded hole 514 and the optical component shell or housing need not be generally circular. Additionally, although in this example, the housing 502 includes one or more alignment protrusions 518*a-d* and the optical component shell includes complementary one or more alignment indentations, it shall be understood that the housing 502 may include one or more alignment indentations and the optical component shell may include complementary one or more alignment protrusions. In the same spirit, the housing 502 may include a mix of alignment structures and the optical component shell may include a mix of complementary alignment structures.

Figure 6A:
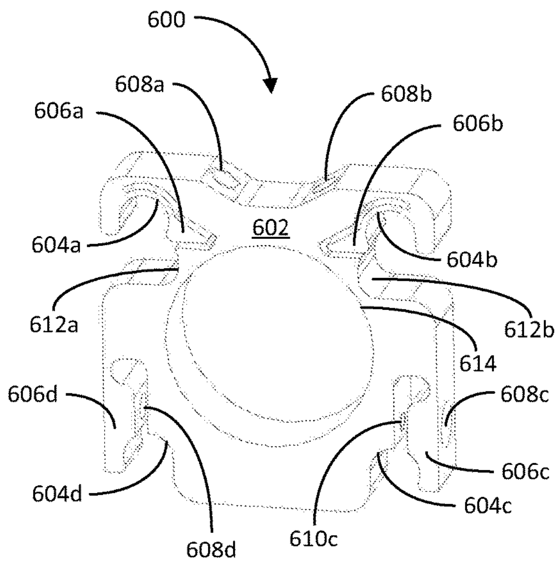
FIGS. 6A-6B illustrate perspective and front views of yet another exemplary optical component mount for an exemplary optical rail system in accordance with another aspect of the disclosure.
Figure 6B:
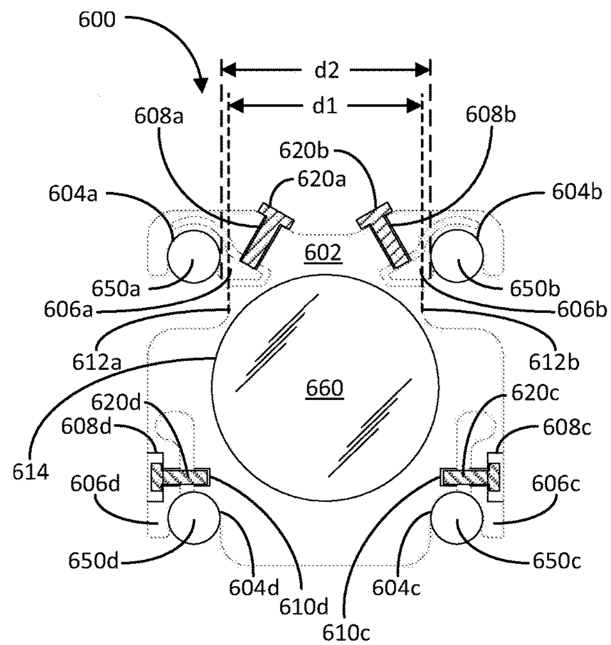

FIGS. 6A-6B illustrate perspective and front views of yet another exemplary optical component mount 600 for an exemplary optical rail system in accordance with another aspect of the disclosure. The optical component mount 600 is similar to the optical component mount 400, and includes many of the same elements as indicated by the same reference numbers with the most significant digit being a "6" not a "4". The optical component mount 600 differs from the optical component mount 400 in that the mount 600 includes a different structure for locking to the upper rails 650*a-b* of an optical rail system.

In particular, the optical component mount 600 comprises a housing 602 including a plurality of grooves 604*a-d* for receiving in a friction fit manner portions of rails 650*a-d* of an optical rail system, respectively. The housing 602 further includes a structure for more securely mating or locking the optical component mount 500 onto the lower rails 550*c-d* of an optical rail system. Such structure includes flexible flanges 506*c-d*, counterbore non-threaded holes 608*c-d*, threaded holes 610*c-d*, and screws 620*c-d*, respectively. The locking and unlocking operations of these elements have been already discussed with reference to optical component mount 400. The optical component mount 600 also includes an optical component dock 612 for securely receiving an optical component 660. As previously discussed, the optical component dock 614 may be configured in many different manners to effectuate the secured mounting to the optical component 660.

As discussed above, the optical component mount 600 includes a different structure for securing the mount to the upper rails 650*a-b*. In particular, the housing 602 includes flexible flanges 606*a-b*, which forms portions of the internal boundaries of the grooves 604*a-b*, respectively. The housing 602 further includes threaded thru-holes 608*a-b* extending from upper inclined surfaces of the housing 602 to proximate the flexible flanges 606*a-b*, respectively. Additionally, the optical component 600 further includes recesses 612*a-b* proximate the mouths of the grooves 604*a-b* to receive the rails 650*a-b* prior to insertion into and after removal from the grooves, respectively.

When the rails 650*a-b* are situated within the grooves 604*a-b*, locking screws 620*a-b* may be threaded into the threaded thru-holes 608*a-b*. Tightening the locking screws 620*a-b* causes the ends of the locking screws to apply pressure on the flexible flanges 606*a-b* to more securely mate or lock the rails 650*a-b* within the grooves 604*a-b*, respectively. It follows that loosening the locking screws 620*a-b* reduces or eliminates the pressure of the screws against the flexible flanges 606*a-b* to facilitate the removal of the optical component mount 600 from the rails 650*a-b*.

Although, in this exemplary embodiment, the locking structure for the upper rails 650*a-b* is different than the locking structure for the lower rails 650*c-d*, it shall be understood that the optical component mount 600 may be configured to employ the upper locking structure for all of the rails 650*a-d*. In the same spirit, the optical component mount 600 may employ a different combination or arrangement of the lower and upper locking structures, as well as employ a locking structure that is different than both the upper and lower locking structures.

Figure 7A:
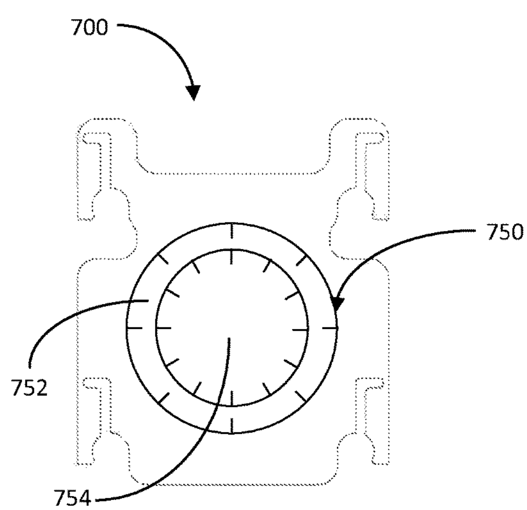
FIGS. 7A-7B illustrate perspective and front views of yet another exemplary optical component mount for an exemplary optical rail system, the optical component mount including an optically-adjustable component in accordance with another aspect of the disclosure.
Figure 7B:
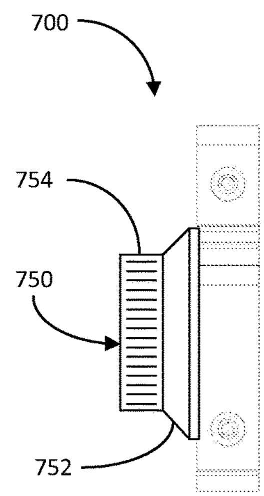

FIGS. 7A-7B illustrate perspective and front views of yet another exemplary optical component mount 700 for an exemplary optical rail system, the optical component mount 700 including an optically-adjustable optical component 750 in accordance with another aspect of the disclosure. As discussed above, many different optical components may be mounted on any of the optical component mounts described herein. Some of these optical components may have fixed or non-adjustable characteristics, and others may have adjustable characteristics.

As illustrated, the optical component 750 may be mounted to the centrally located dock of the optical component mount 700, similar to the mounting of optical components as described with reference to optical component mounts 400, 500, and 600. The optical component 750 may have one or more user interfaces 752 and 754 for adjusting one or more characteristics of the optical component. In this example, the one or more user interfaces 752 and 754 are configured as coaxial dials. However, it shall be understood that the optical component 750 may have other types of user interfaces for adjusting one or more characteristics of the optical components. Such user interfaces may include, but not limited to, mechanical interfaces, wired electrical interfaces, wireless electrical interface, optical interfaces, magnetic interfaces, and others.

Some examples of optical components that may have adjustable characteristics include polarizers, wave plates, movable lenses (e.g., azimuth and/or elevation control, etc.), movable mirrors, other movable optical devices, laser sources (e.g., wavelength, power, etc.), modulators (e.g., modulation frequency, duty cycle, etc.), choppers (e.g., chopper frequency, duty cycle, etc.), and other adjustable optical components.

Figure 8A:
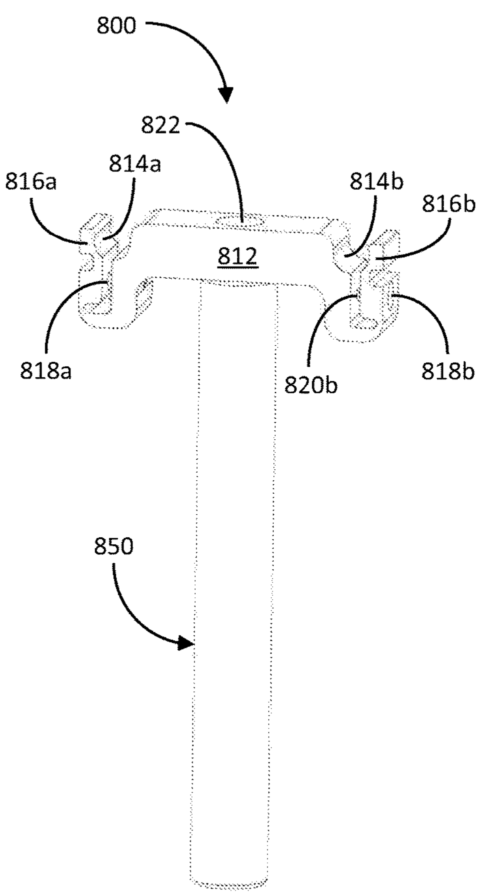
FIGS. 8A-8B illustrate perspective and front views of an exemplary mount for supporting an exemplary optical rail system on an optical table or other structure in accordance with another aspect of the disclosure.
Figure 8B:
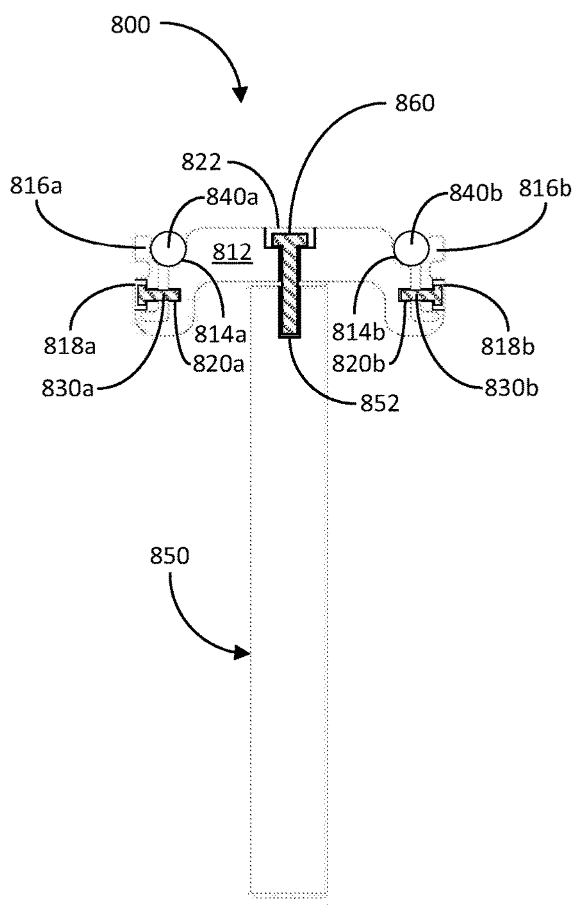

FIGS. 8A-8B illustrate perspective and front views of an exemplary rail mount 800 for supporting an exemplary optical rail system on an optical table or other structure in accordance with another aspect of the disclosure. The rail mount 800 comprises a housing 812 including a pair of grooves 814*a-b* for mating with rails 840*a-b*, respectively. The rail mount 800 includes structure for securely locking the mount to the rails 840*a-b*. This structure includes flexible flanges 816*a-b*, counterbore non-threaded holes 818*a-b*, threaded holes 820*a-b*, configured similarly to the locking structure described with reference to optical component mounts 400 and 500. Similar to those embodiment, locking screws 830*a-b* may be inserted through the non-threaded holes 818*a-b* and threaded with the threaded holes 820*a-b* in order to more securely mate or lock the rails 840*a-b* to the mount 800, as previously discussed. It shall be understood the rail mount 800 may use another type of locking structure, such as the locking structure of optical component mount 600 for securely mating with the upper rails 650*a-b*, or a different type.

For securely mating to a post 850, the rail mount 800 comprises a counterbore, non-threaded hole 822 that extends from an upper surface to a lower surface of the housing 812. The post 852 includes a threaded hole 852 that extends from an upper surface of the post to a defined distance longitudinally within the post. When the rail mount 800 is properly mounted to the post 850, the non-threaded hole 822 of the mount coaxially aligns with the threaded bore 852 of the post. A screw 860 is inserted through the non-threaded hole 822 of the housing 812 and threaded with the threaded hole 852 of the post 850, in order to attach the mount to the post. The lower end of the post 850 may be configured for attachment to an optical table or other structure.

Figure 9:
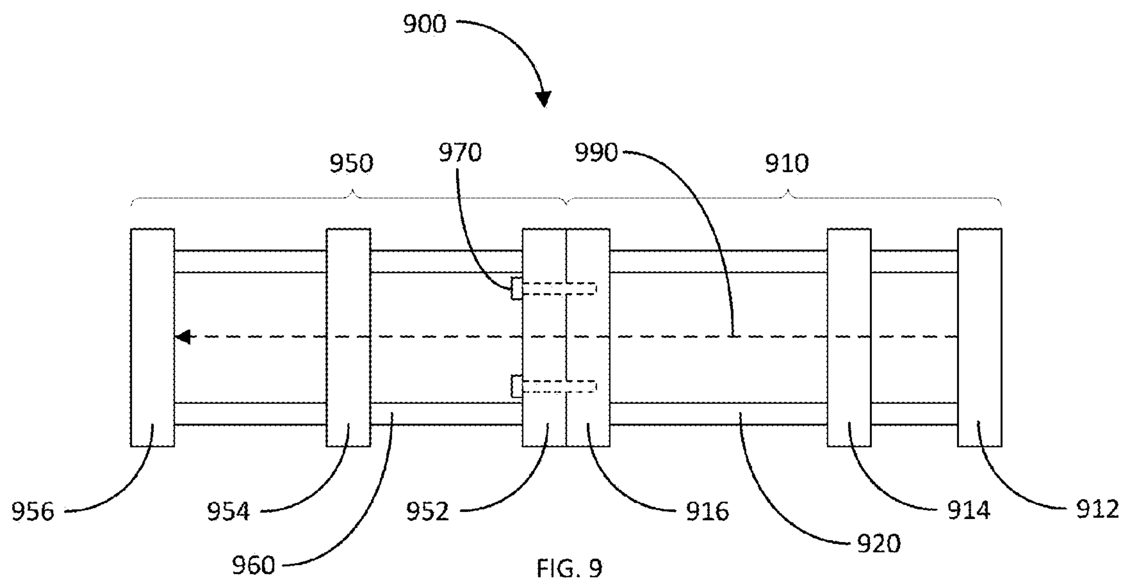
FIG. 9 illustrates a side view of an exemplary longitudinally-cascaded optical rail system in accordance with another aspect of the disclosure.

FIG. 9 illustrates a side view of an exemplary longitudinally-cascaded optical rail system 900 in accordance with another aspect of the disclosure. A plurality of optical rail systems may be cascaded in different manners to facilitate the setting up of a desired configuration of an optical measurement system. In this example, the optical rail system 900 comprises a pair of optical rail subsystems 910 and 950 cascaded or attached to each other along the longitudinal axis of the systems.

In particular, the optical rail subsystem 910 comprises a plurality of optical component mounts 912, 914, and 916 mounted to a plurality of rails 920, as per the previously-described embodiments. Although, in this example, the optical rail subsystem 910 includes three (3) optical component mounts 912, 914, and 916, it shall be understood that the subsystem 910 may include more or less than three (3) optical component mounts. In this example, the optical component mount 912 is situated at one end of the optical rail subsystem 910, the optical component mount 916 is situated at the opposite end of the optical rail subsystem 910, and the optical component mount 914 is situated between the optical component mounts 912 and 916.

Similarly, the optical rail subsystem 950 comprises a plurality of optical component mounts 952, 954, and 956 mounted to a plurality of rails 960, as per the previously-described embodiments. Although, in this example, the optical rail subsystem 950 includes three (3) optical component mounts 952, 954, and 956, it shall be understood that the subsystem 950 may also include more or less than three (3) optical component mounts. In this example, the optical component mount 952 is situated at one end of the optical rail subsystem 950, the optical component mount 956 is situated at the opposite end of the optical rail subsystem 950, and the optical component mount 954 is situated between the optical component mounts 952 and 956.

For cascading or attaching the optical rail subsystems 910 and 950 together, the end optical component mounts 916 and 952 of the respective optical rail subsystems 910 and 950 may be configured to securely attach to each other. For instance, optical component mount 952 may be configured with one or more non-threaded thru holes and optical component mount 916 may be configured with one or more threaded holes. When the optical component mount 952 is properly mated with the optical component mount 916, the one or more non-threaded holes of the mount 952 registers or aligns with the one or more threaded holes of the mount 916, allowing screws 970 to be inserted into the respective hole pair in order to securely attach the mounts 952 and 916 together. The positioning of the holes and screws 970 are configured to substantially align the optical rail systems 910 and 950 with the optical signal path 990.

Figure 10:
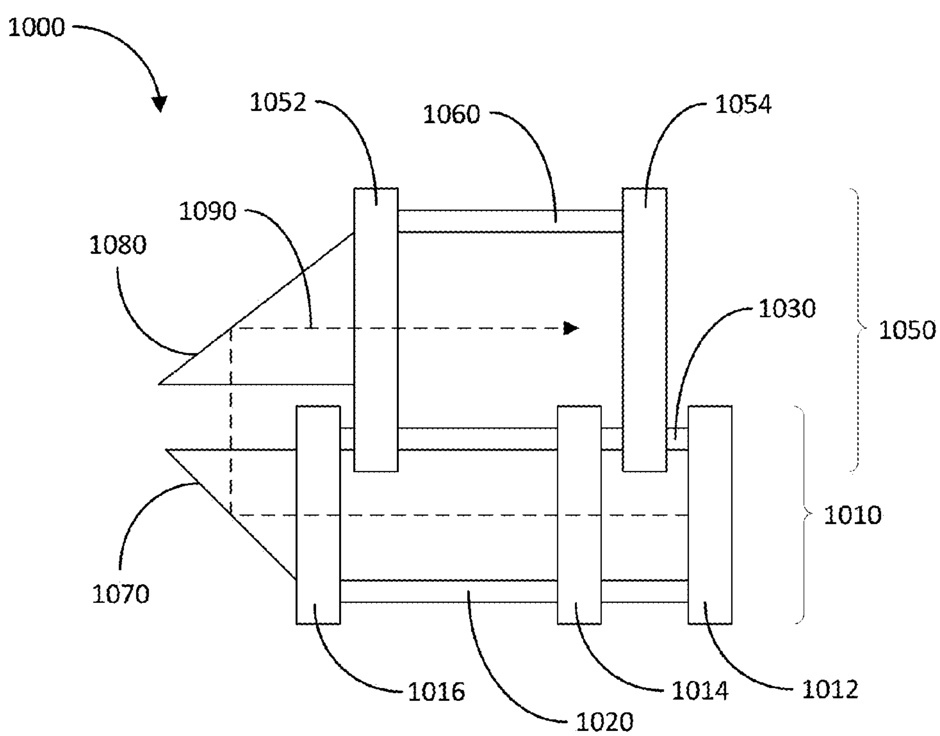
FIG. 10 illustrates a side view of an exemplary laterally-cascaded optical rail system in accordance with another aspect of the disclosure.

FIG. 10 illustrates a side view of an exemplary laterally-cascaded optical rail system 1000 in accordance with another aspect of the disclosure. In the previous example, optical rail subsystems were cascaded along the longitudinal axis of the optical rail system 900. In this example, the optical rail system 1000 comprises a pair of optical rail subsystems 1010 and 1050 cascaded or attached to each other along a lateral axis of the system.

In particular, the optical rail subsystem 1010 comprises a plurality of optical component mounts 1012, 1014, and 1016 mounted to a plurality of lower and upper rails 1010 and 1030, as per the previously-described embodiments. Although, in this example, the optical rail subsystem 1010 includes three (3) optical component mounts 1012, 1014, and 1016, it shall be understood that the subsystem 1010 may include more or less than three (3) optical component mounts. In this example, the optical component mount 1012 is situated at one end of the optical rail subsystem 1010, the optical component mount 1016 is situated at the opposite end of the optical rail subsystem 1010, and the optical component mount 1014 is situated between the optical component mounts 1012 and 1016.

The optical rail subsystem 1050 comprises a plurality of optical component mounts 1052 and 1054, both situated at the ends of the optical rail subsystem 1050. The optical component mounts 1052 and 1054 include lower grooves mounted to the upper rails 1030 of the optical rail sbsystem 1010. In other words, the optical rail subsystems 1010 and 1050 share the rails 1030. The optical component mounts 1052 and 1054 include upper grooves mounted to upper rails 1060. Although, in this example, the optical rail subsystem 1050 includes two (2) optical component mounts 1052 and 1054, it shall be understood that the subsystem 1050 may include a different number of mounts.

In order to direct the light 1090 between the optical rail subsystems 1010 and 1050, suitable optical components 1070 and 1080, such as mirrors, may be provided to direct the light from the lower optical rail subsystem 1010, for example, to the upper optical rail subsystem 1050. In this example, the optical components 1070 and 1080 are mounted to the optical component mounts 1016 and 1052, respectively.

Although the optical rail systems 900 and 1000 described a plurality of optical rail subsystems cascaded together in longitudinal and lateral axes, respectively, it shall be understood that optical rail subsystems may be cascaded or coupled together in both the longitudinal and lateral axes, as well as in other manners.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An optical rail system, comprising:

a plurality of rails; and a mount secured to the plurality of rails, wherein the mount comprises a housing including a plurality of grooves registered with respective portions of the plurality of rails, wherein the housing comprises recesses proximate the grooves, and wherein the recesses are configured to accommodate the rails prior to insertion into and after removal from the grooves, respectively.

2. The optical rail system of claim 1, wherein the grooves are registered with the respective portions of the rails in a friction fit manner.

3. The optical rail system of claim 1, wherein the housing comprises a plurality of flexible flanges forming portions of respective boundaries of the grooves.

4. The optical rail system of claim 3, wherein the mount comprises a plurality of locking devices for securely attaching the rails to the housing within the grooves, respectively.

5. The optical rail system of claim 4, wherein the locking devices comprise screws extended through holes within the flexible flanges and threaded with threaded holes within the housing, wherein tightening of the screws moves the flexible flanges against the rails within the grooves, respectively.

6. The optical rail system of claim 4, wherein the locking devices comprise screws extended through threaded holes within the housing and making end contact with the flexible flanges, wherein tightening of the screws moves the flexible flanges against the rails within the grooves, respectively.

7. The optical rail system of claim 1, wherein the mount further comprises a dock for securely receiving an optical component.

8. The optical rail system of claim 7, wherein the dock is configured as a threaded hole within the housing, the threaded hole being configured to thread with a threaded outer shell of the optical component.

9. The optical rail system of claim 7, wherein the dock is configured as a non-threaded hole within the housing.

10. The optical rail system of claim 9, wherein the housing comprises one or more alignment protrusions or indentations configured to register with one or more alignment indentations or protrusions of an outer shell of the optical component, respectively.

11. The optical rail system of claim 9, further comprising a locking device for more securely maintaining the optical component within the non-threaded hole.

12. The optical rail system of claim 11, wherein the locking device comprises a screw extended through a threaded hole within the housing and making end contact with an outer shell of the optical component, wherein tightening of the screw causes the end contact to apply more pressure against the optical component to more securely lodge the optical component within the non-threaded hole of the housing.

13. A mount for an optical rail system, comprising a housing including a plurality of grooves configured to securely register with respective portions of a plurality of rails of the optical rail system, wherein the housing comprises recesses proximate of the grooves, and wherein the recesses are configured to accommodate the rails prior to insertion into and after removal from the grooves, respectively.

14. The mount of claim 13, wherein the grooves are configured to securely register with the respective portions of the rails in a friction fit manner.

15. The mount of claim 13, wherein the housing comprises a plurality of flexible flanges forming portions of respective boundaries of the grooves.

16. The mount of claim 15, further comprising a plurality of locking devices for securely attaching the rails to the housing within the grooves, respectively.

17. The mount of claim 16, wherein the locking devices comprise screws extended through holes within the flexible flanges and threaded with threaded holes within the housing, wherein tightening of the screws moves the flexible flanges against the rails within the grooves, respectively.

18. The mount of claim 16, wherein the locking devices comprise screws extended through threaded holes within the housing and making end contact with the flexible flanges, wherein tightening of the screws moves the flexible flanges against the rails within the grooves, respectively.

19. The mount of claim 13, further comprising a dock for securely receiving an optical component.

20. The mount of claim 19, wherein the dock is configured as a threaded hole within the housing, the threaded hole being configured to thread with a threaded outer shell of the optical component.

21. The mount of claim 19, wherein the dock is configured as a non-threaded hole within the housing.

22. The mount of claim 21, wherein the housing comprises one or more alignment protrusions or indentations configured to register with one or more alignment indentations or protrusions in an outer shell of the optical component, respectively.

23. The mount of claim 21, further comprising a locking device for more securely maintaining the optical component within the non-threaded hole.

24. The mount of claim 23, wherein the locking device comprises a screw extended through a threaded hole within the housing and making end contact with an outer shell of the optical component, wherein tightening of the screw causes the end contact to apply more pressure against the optical component to more securely lodge the optical component within the non-threaded hole of the housing.

25. An optical rail system, comprising:

a plurality of rails; and a plurality of electronic component mounts, wherein each of the mount comprises:

a housing including a plurality of grooves configured to securely register with respective portions of the rails, wherein the housing comprises recesses proximate the grooves, and wherein the recesses are configured to accommodate the rails prior to insertion into and after removal from the grooves, respectively; and a dock configured to securely host an optical component.

* * * * *